United States Patent
Askan et al.

(10) Patent No.: US 10,978,258 B2
(45) Date of Patent: Apr. 13, 2021

(54) DIRECT CURRENT CIRCUIT BREAKER DEVICE

(71) Applicant: Eaton Intelligent Power Limited, Dublin (IE)

(72) Inventors: Kenan Askan, Vienna (AT); Michael Bartonek, Vienna (AT); Matthias Katzensteiner, Vienna (AT)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 16/963,265

(22) PCT Filed: Jan. 21, 2019

(86) PCT No.: PCT/EP2019/051406
§ 371 (c)(1),
(2) Date: Aug. 28, 2020

(87) PCT Pub. No.: WO2020/151805
PCT Pub. Date: Jul. 30, 2020

(65) Prior Publication Data
US 2021/0074490 A1  Mar. 11, 2021

(51) Int. Cl.
*H01H 9/54* (2006.01)
*H02H 3/02* (2006.01)
(Continued)

(52) U.S. Cl.
CPC ......... *H01H 9/542* (2013.01); *H02H 3/021* (2013.01); *H02H 3/087* (2013.01); *H02H 3/105* (2013.01); *H01H 2009/544* (2013.01)

(58) Field of Classification Search
CPC ............. G01R 31/085; G01R 31/327; G01R 31/3275; H01H 2009/543;
(Continued)

(56) References Cited

U.S. PATENT DOCUMENTS 8,482,885 B2   7/2013   Billingsley et al.
9,947,496 B2*  4/2018   Niehoff ................ H02H 7/222
(Continued)

FOREIGN PATENT DOCUMENTS

DE    3519472 A1   1/1986
DE    4344126 A1   7/1995
(Continued)

*Primary Examiner* — Jared Fureman
*Assistant Examiner* — Nicolas Bellido
(74) *Attorney, Agent, or Firm* — Leydig, Voit & Mayer, Ltd.

(57) ABSTRACT

A DC circuit breaker includes: a first current section of a first electrical polarity from a first supply terminal of the DC circuit breaker to a first load terminal of the DC circuit breaker; a second current section of a second electrical polarity from a second supply terminal of the DC circuit breaker to a second load terminal of the DC circuit breaker; a mechanical bypass switch arranged in the first current section or the second current section, the mechanical bypass switch having at least one bypass switch excitation coil; a first semiconductor circuit arrangement connected in parallel with the mechanical bypass switch; an electronic control unit of the DC circuit breaker for actuating the first semiconductor circuit arrangement; a second semiconductor circuit arrangement to be actuated by the electronic control unit, which second semiconductor circuit arrangement is connected to the bypass switch excitation coil by circuitry.

8 Claims, 2 Drawing Sheets

(51) Int. Cl.
*H02H 3/087* (2006.01)
*H02H 3/10* (2006.01)

(58) Field of Classification Search
CPC ............ H01H 2009/544; H01H 33/38; H01H 33/596; H01H 33/72; H01H 47/002; H01H 71/123; H01H 83/20; H01H 9/40; H01H 9/42; H01H 9/541; H01H 9/542; H01H 9/548; H02H 1/06; H02H 3/021; H02H 3/025; H02H 3/05; H02H 3/06; H02H 3/08; H02H 3/087; H02H 3/10; H02H 3/105; H02H 3/24; H02H 9/045
See application file for complete search history.

(56) References Cited

U.S. PATENT DOCUMENTS

| | | | | |
|---|---|---|---|---|
| 10,340,678 | B1* | 7/2019 | Sorenson | G01R 31/327 |
| 10,707,029 | B2* | 7/2020 | Askan | H02H 3/08 |
| 2003/0193770 | A1* | 10/2003 | Chung | H01H 9/542 |
| | | | | 361/118 |
| 2015/0162154 | A1* | 6/2015 | Lueck | H01H 47/325 |
| | | | | 361/155 |
| 2016/0203932 | A1 | 7/2016 | Niehoff | |
| 2019/0157856 | A1* | 5/2019 | Askan | H01H 9/0066 |
| 2019/0206638 | A1* | 7/2019 | Askan | H01H 9/542 |
| 2019/0229525 | A1* | 7/2019 | Askan | H03K 17/164 |
| 2019/0341764 | A1 | 11/2019 | Askan | |
| 2019/0341769 | A1* | 11/2019 | Askan | H02H 1/0007 |
| 2020/0058454 | A1* | 2/2020 | Askan | H01H 9/542 |
| 2020/0194195 | A1* | 6/2020 | Askan | H01H 9/542 |

FOREIGN PATENT DOCUMENTS

| | | | | |
|---|---|---|---|---|
| DE | 102017101452 A1 | 7/2018 | | |
| EP | 0660484 A2 | 6/1995 | | |
| WO | WO 2015028634 A1 | 3/2015 | | |
| WO | WO-2017220443 A1 * | 12/2017 | ............ | H01H 9/548 |
| WO | WO 2017220443 A1 | 12/2017 | | |

* cited by examiner

DIRECT CURRENT CIRCUIT BREAKER DEVICE

CROSS-REFERENCE TO PRIOR APPLICATIONS

This application is a U.S. National Phase application under 35 U.S.C. § 371 of International Application No. PCT/EP2019/051406, filed on Jan. 21, 2019, and claims benefit to German Patent Application No. DE 10 2018 101 309.4, filed on Jan. 22, 2018. The International application was published in German on Jul. 30, 2020 as WO 2020/151805 A1.

FIELD

The invention relates to a DC circuit breaker.

BACKGROUND

So-called hybrid circuit breakers for DC applications are known. Circuit breakers of this kind have a so-called bypass switch as a central or functionally essential component. This bypass switch is intended to open particularly quickly in the case of a safety-relevant deactivation process in order to cause the current to commutate to the power semiconductors before the current over the breaker rises too much, which power semiconductors then deactivate the current in question. A bypass switch is a relay having mechanical switching contacts. In order to actuate this relay, hybrid circuit breakers of this kind have a driver circuit which is powered by a power supply unit of the circuit breaker.

The required particularly quick opening of the contacts of the bypass switch necessitates a correspondingly large amount of electrical energy which has to be quickly available or quickly output to the driver circuit. This requires correspondingly powerful power supply units and energy storage devices, in particular electrolytic capacitors, for supplying the corresponding driver circuits. However, such powerful power supply units and capacitors require a considerable amount of space and contribute significantly to the spatial enlargement of such circuit breakers. Furthermore, a power supply unit draws a closed-circuit current such that, in addition to the space required within the circuit breaker, there is also a considerable power loss, which has to be dissipated via corresponding cooling surfaces. The capacitors also have to be constantly recharged, otherwise they lose their charge over time. The resulting power loss leads to a temperature increase within the circuit breaker, which can reduce the service life of the safety-relevant semiconductors of the circuit breaker.

Although the use of a drive of the bypass switch with a high number of turns would reduce the required current, this would also lead—due to the higher inductance of such a coil having a high number of turns—to a larger time constant and thus to a slowing down of the opening process of the bypass switch.

Circuit breakers often carry out only very few deactivation processes due to dangerous electrical states. Most of the time, therefore, a correspondingly powerful power supply unit and the corresponding capacitors are not required since the maximum power that can be output is not required, and the power loss which has to be continuously dissipated is disadvantageous. In order, therefore, to be able to deactivate short-circuits with a reasonable space requirement and power loss to be dissipated, known breakers have a choke, which is also referred to as "time buyer inductance," in the current path, which naturally only acts on changes in the current flow, and reduces the rate at which the current rises in the case of a short-circuit. Nevertheless, a choke also requires a lot of space and exhibits ohmic losses.

SUMMARY

In an embodiment, the present invention provides a DC circuit breaker, comprising: a first current section of a first electrical polarity from a first supply terminal of the DC circuit breaker to a first load terminal of the DC circuit breaker; a second current section of a second electrical polarity from a second supply terminal of the DC circuit breaker to a second load terminal of the DC circuit breaker; a mechanical bypass switch arranged in the first current section or the second current section, the mechanical bypass switch having at least one bypass switch excitation coil; a first semiconductor circuit arrangement connected in parallel with the mechanical bypass switch; an electronic control unit of the DC circuit breaker configured to actuate the first semiconductor circuit arrangement; a second semiconductor circuit arrangement configured to be actuated by the electronic control unit, which second semiconductor circuit arrangement is connected to the bypass switch excitation coil by circuitry in order to actuate the second semiconductor circuit arrangement, wherein at least one terminal of the second semiconductor circuit arrangement is directly connected to the second supply terminal by circuitry.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a DC circuit breaker of the kind mentioned at the outset, by means of which the above-mentioned disadvantages can be avoided, which has a low volume and simple design, and which allows a short-circuit to be quickly deactivated.

This allows a DC circuit breaker to be provided which has a low volume or low installation space requirements and a simple design. Although a DC circuit breaker of this kind has a power supply unit, this is considerably smaller than in the case of a circuit breaker in which the power supply unit also has to provide the energy for the emergency deactivation operation for the bypass switch. At the same time, a DC circuit breaker according to the invention can open the bypass switch more quickly than a conventional circuit breaker with a correspondingly powerful power supply unit.

It has been found that, in particular environments, the bypass switch can be opened particularly quickly in that no power supply unit of the DC circuit breaker in question is used for this particularly quick opening. Thus, instead of increasing the energy supply capacity within the DC circuit breaker by constantly enlarging the power supply unit, according to the invention the power supply unit can actually be reduced in size, since it is no longer required for the particularly quick opening of the bypass switch, but is instead used only for the supply of energy to the additional components of the DC circuit breaker.

Although a circuit breaker of this kind preferably still has a power supply unit for supplying power to the electronic components, said power supply unit does not have to be capable of supplying energy in order to open the bypass switch in the case of a short-circuit deactivation. Instead, a circuit breaker according to the invention is provided to operate together with a rectifier, and uses the smoothing capacitance available at the output of the rectifier or the at least one smoothing capacitor as an energy source for driving the bypass switch. Since the voltage at this capacitor is considerably higher than an internal operating voltage of an electronic circuit and a smoothing capacitor of this kind usually has a capacitance which is orders of magnitude higher than the capacitance installed in a conventional DC circuit breaker for supporting an internal power supply thereof, the DC circuit breaker according to the invention has—compared with conventional hybrid circuit breakers—many times the electrical charge or energy for driving the bypass switch. This means that the drive of the bypass switch can have a low number of turns, which means that the time constant can be kept low, thus further reducing the opening time of the bypass switch. The quicker opening of the bypass switch also makes it possible to reduce the inductance of an optional choke.

Figure 1:
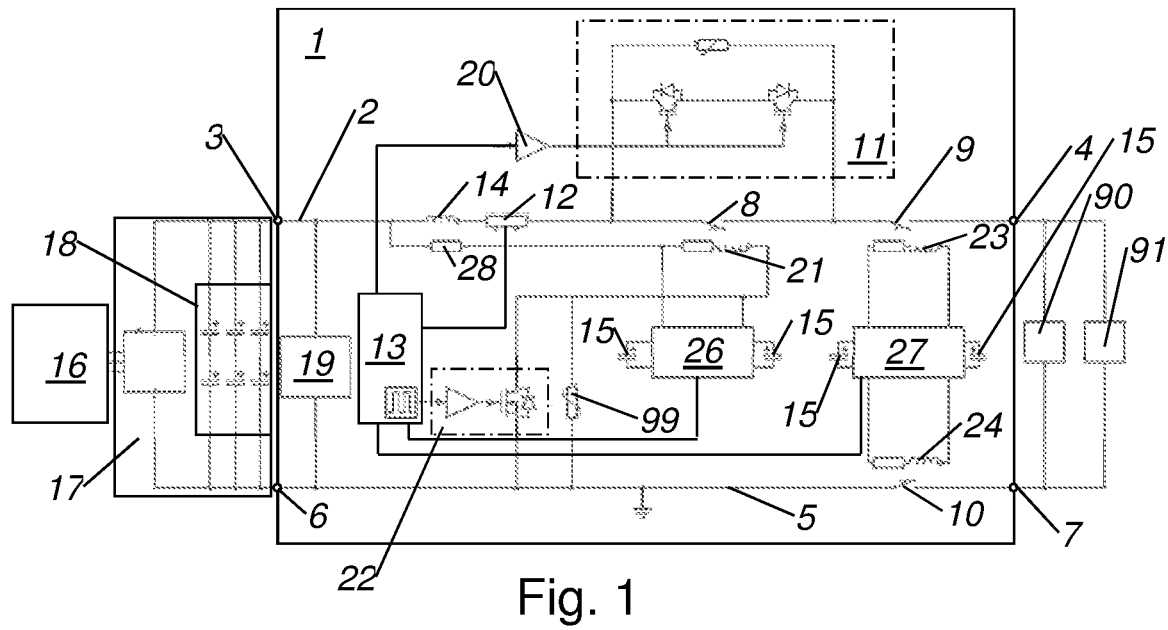
FIG. 1 schematically shows a first embodiment of a DC circuit breaker according to the invention, and an electrical environment comprising an electrical source, a load and fault.
Figure 2:
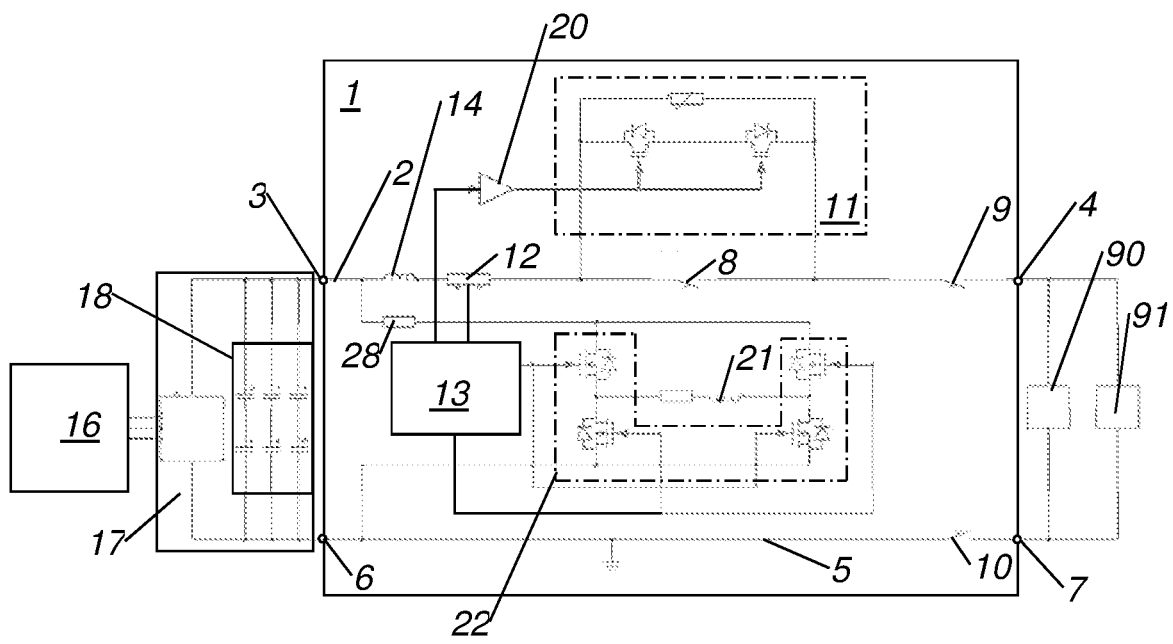
FIG. 2 schematically shows a second embodiment of a DC circuit breaker according to the invention, and an electrical environment comprising an electrical source, a load and fault.
Figure 3:
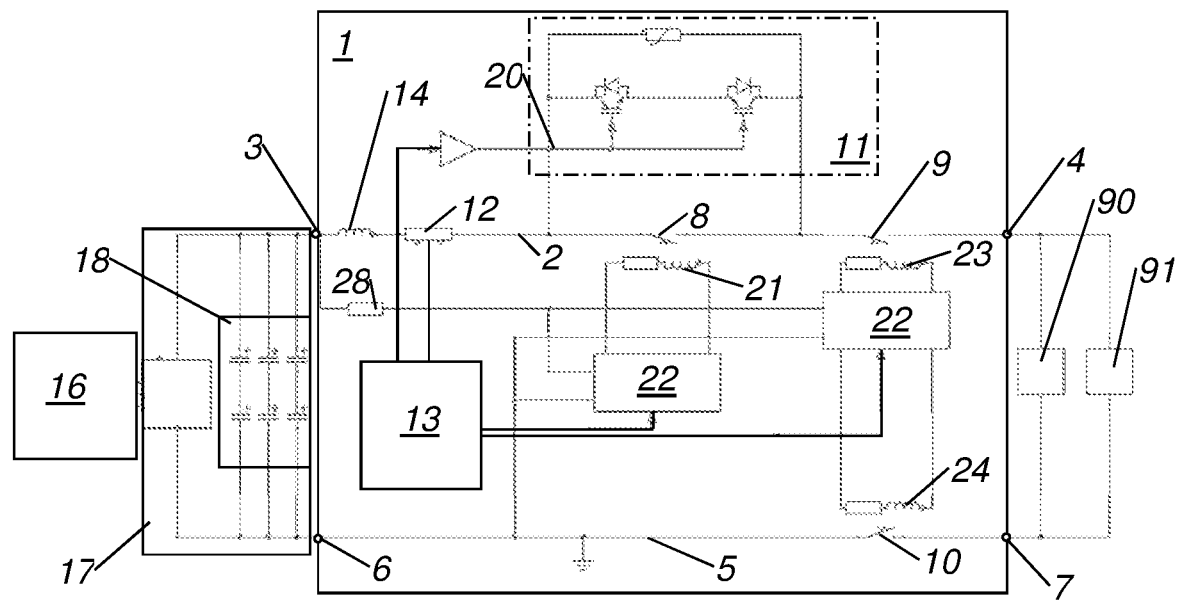
FIG. 3 schematically shows a third embodiment of a DC circuit breaker according to the invention, and an electrical environment comprising an electrical source, a load and fault.
Figure 4:
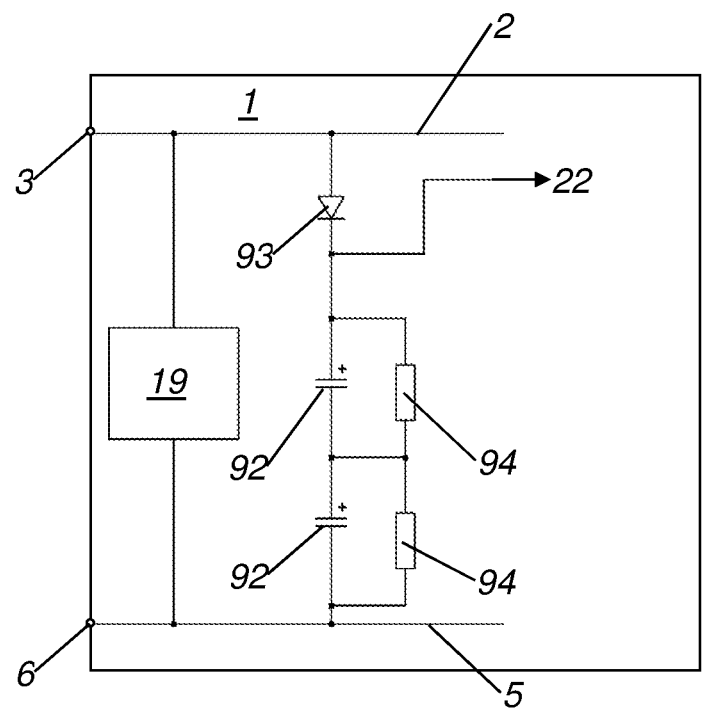
FIG. 4 schematically shows only a part of a fourth embodiment of a DC circuit breaker according to the invention.

FIGS. 1 to 3 show a DC circuit breaker 1 comprising a first current section 2 of a first electrical polarity from a first supply terminal 3 of the DC circuit breaker 1 to a first load terminal 4 of the DC circuit breaker 1, and comprising a second current section 5 of a second electrical polarity from a second supply terminal 6 of the DC circuit breaker 1 to a second load terminal 7 of the DC circuit breaker 1, a mechanical bypass switch 8 being arranged in the first current section 2 or the second current section 5, the bypass switch 8 having at least one bypass switch excitation coil 21, a first semiconductor circuit arrangement 11 of the DC circuit breaker 1 being connected in parallel with the bypass switch 8, an electronic control unit 13 of the DC circuit breaker 1 being designed to actuate the first semiconductor circuit arrangement 11, the DC circuit breaker 1 having a second semiconductor circuit arrangement 22 actuated by the control unit 13, which second semiconductor circuit arrangement 22 is connected to the bypass switch excitation coil 21 by circuitry in order to actuate same, at least one terminal of the second semiconductor circuit arrangement 22 being directly connected to the second supply terminal 6 by circuitry. FIG. 4 shows a part of a DC circuit breaker 1 of this kind.

A DC circuit breaker 1 can thus be provided which has a low volume or low installation space requirements and a simple design. Although a DC circuit breaker 1 of this kind preferably has a power supply unit 19, this is considerably smaller than in the case of a circuit breaker in which the power supply unit 19 also has to provide the energy for the emergency deactivation operation for the bypass switch 8. At the same time, a DC circuit breaker 1 according to the invention can open the bypass switch 8 more quickly than a conventional circuit breaker with a correspondingly powerful power supply unit.

It has been found that, in particular environments, the bypass switch 8 can be opened particularly quickly in that no power supply unit of the DC circuit breaker 1 in question is used for this particularly quick opening. Thus, instead of increasing the energy supply capacity within the DC circuit breaker 1 by constantly enlarging the power supply unit 19, according to the invention the power supply unit 19 can actually be reduced in size, since it is no longer required for the particularly quick opening of the bypass switch 8, but is instead used only for the supply of energy to the additional components of the DC circuit breaker 1.

Although a circuit breaker 1 of this kind preferably still has a power supply unit 19 for supplying power to the electronic components, said power supply unit 19 does not have to be capable of supplying energy in order to open the bypass switch 8 in the case of a short-circuit deactivation. Instead, a DC circuit breaker 1 according to the invention is provided to operate together with a rectifier 17, and uses the smoothing capacitance available at the output of the rectifier 17 or the at least one smoothing capacitor 18 as an energy source for driving the bypass switch 8. Since the voltage at this capacitor 18 is considerably higher than an internal operating voltage of an electronic circuit and a smoothing capacitor 18 of this kind usually has a capacitance which is orders of magnitude higher than the capacitance installed in a conventional DC circuit breaker 1, the DC circuit breaker 1 according to the invention has—compared with conventional hybrid DC circuit breakers—many times the electrical charge or energy for driving the bypass switch 8.

For example, the drive of the bypass switch 8 of a known circuit breaker is powered by a capacitor 15 having a voltage of 60V and a capacitance of 100 µF. By contrast, professional rectifier applications for three-phase current with an outer conductor voltage of 400 $V_{AC}$ typically have a voltage of from 650 to 770 $V_{DC}$, and a capacitance typically of between 2.5 and 4 mF. The available amount of charge for a DC circuit breaker 1 according to the invention is therefore between approx. 250 and 500 times greater than in the case of a conventional circuit breaker.

This means that the drive of the bypass switch 8 can have a low number of turns, which means that the time constant can be kept low, thus further reducing the opening time of the bypass switch 8. The quicker opening of the bypass switch 8 also makes it possible to reduce the inductance of an optional choke 14.

A further advantage of the DC circuit breaker 1 according to the invention is the fact that, because of the high energy of the capacitances 18 of the rectifier 17, there is sufficient energy available to quickly open the bypass switch 8 even in the case of an activation attempt, under a short-circuit, immediately following a short-circuit trip. This is relevant, for example, if an attempt is made to activate the DC circuit breaker 1 during a short-circuit that is ongoing.

FIGS. 1 to 3 also show the electrical environment, with an electrical load 91 and an electrical fault 90 being shown on the load side. On the input side, an electrical source 16, a rectifier 17 and the above-mentioned capacitances or the at least one smoothing capacitor 18 are shown.

The DC circuit breaker 1 according to the invention is intended for use with DC current or DC voltage. The DC circuit breaker 1 according to the invention can only be used together with a rectifier 17, which rectifier 17, in a manner known per se, has at least one capacitor 18 at its output, which capacitor is usually referred to as a smoothing capacitor 18. Typically, a plurality of distinct capacitors connected in parallel, usually electrolytic capacitors, are arranged at this point. The construction of a rectifier 17, and the use of corresponding capacitors 18 at the output thereof, are commonplace for a person skilled in the field of electrical engineering.

The DC circuit breaker 1 has two current sections 2, 5 which are intended for different electrical polarities, i.e. plus and minus. The DC circuit breaker 1 therefore has the first current section 2 for the first electrical polarity, which extends from the first supply terminal 3 to the first load terminal 4, and the second current section 5 for the second electrical polarity, which is different from the first electrical polarity, which extends from the second supply terminal 6 to the second load terminal 7. The individual terminals 3, 4, 6, 7 are preferably designed as connection terminals.

The DC circuit breaker 1 preferably has a housing which is preferably made from insulating material, at least in regions, and which preferably has at least one cooling surface, at least in regions.

FIGS. 1 to 3 also show an electrical load 91 and an electrical fault 90, which are each connected to the load terminals 4, 7.

The protection for the first current section 2 described according to the invention can also be provided on the second current section 5.

A mechanical or electromechanical bypass switch 8, which is designed as a relay, is arranged in the first current section 2. The bypass switch 8 therefore has at least one bypass switch excitation coil 21, with it preferably also being possible for a plurality of bypass switch excitation coils 21 to be provided. Each of the figures show a bypass switch excitation coil 21, the ohmic coil resistance also being shown beside the symbol for the electrical coil. The bypass switch 8 is preferably designed as a bistable, magnetically locked switch or relay.

The bypass switch 8 is bridged by the first semiconductor circuit arrangement 11, which is fitted with power semiconductors, for example back-to-back IGBTs, and which is designed in particular as a four-quadrant switch. The first semiconductor circuit arrangement 11 preferably also has a varistor 98. The first semiconductor circuit arrangement 11 is assigned a first driver stage 20. The varistors and IGBTs have not been provided with reference signs. The fundamental function of the corresponding circuit is described for instance in WO 2015/028634 A1 from the applicant.

The DC circuit breaker 1 also has an electronic control unit 13 which controls the circuit processes of the DC circuit breaker 1. The control unit 13 is designed to comprise a μC, for example. Accordingly, the control unit 13 of the DC circuit breaker 1 is designed to actuate the first semiconductor circuit arrangement 11.

The DC circuit breaker 1 preferably also has a power supply unit 19 which is intended and correspondingly dimensioned for supplying energy to the control unit 13. Alternatively, the control unit 13 can be supplied with energy via separate auxiliary terminals of the DC circuit breaker 1.

The control unit 13 is designed to detect a short-circuit and/or overcurrent. It can in particular be the case that a current measuring arrangement 12 is arranged at least in the first current section 2 and is connected to the control unit 13, the current measuring arrangement 12 preferably comprising a shunt. In addition, a short-circuit can also be detected by means of the driver 20, which can identify a short-circuit by detecting a desaturation of the power semiconductor circuits of the first semiconductor circuit arrangement 11.

Particularly preferably, a first disconnecting switch 9 having a first disconnecting switch excitation coil 23 is arranged in the first current section 2, and a second disconnecting switch 10 having a second disconnecting switch excitation coil 24 is arranged in the second current section 5. These two disconnecting switches 9, 10 or relays are used to ensure galvanic isolation following successful deactivation of the DC circuit breaker 1.

As already explained, deactivation takes place in that the first semiconductor circuit arrangement 11 is activated and the bypass switch 8 is subsequently opened, at which point the current commutates to the first semiconductor circuit arrangement 11, and is then deactivated thereby. The fundamental function is also described for instance in WO 2015/028634 A1 from the applicant.

The DC circuit breaker 1 also has a second semiconductor circuit arrangement 22, actuated by the control unit 13, for actuating the bypass switch excitation coil 21, which is connected by circuitry to the bypass switch excitation coil 21. The second semiconductor circuit arrangement 22 preferably has at least one power semiconductor switch, and optionally one driver stage. A varistor 99 is preferably connected in parallel with the second semiconductor circuit arrangement 22.

According to the invention, the second semiconductor circuit arrangement 22 is connected by circuitry to the first supply terminal 3 or the second supply terminal 6. This is understood to mean that at least one terminal of the second semiconductor circuit arrangement 22 is directly connected by circuitry to the second supply terminal 6, bypassing the preferably provided power supply unit 19.

The second semiconductor circuit arrangement 22 therefore does not draw any current from the power supply unit 19, which is preferably part of the DC circuit breaker 1, but rather is directly connected to the corresponding supply-side terminals of the DC circuit breaker 1, with preferably only the bypass switch excitation coil 21 and optionally a dropping resistor 28 being arranged in said circuit connections, as is the case for instance in FIGS. 1 and 2. Accordingly, it is further preferred for a current path comprising the second semiconductor circuit arrangement 22 and the bypass switch excitation coil 21 to be connected by circuitry, in particular via a dropping resistor 28, to the first supply terminal 3, bypassing the preferably present power supply unit 19.

In connection with the terminal of the second semiconductor circuit arrangement 22 and also the at least one bypass switch excitation coil 21 and the preferably provided dropping resistor 28, the first and the second supply terminal 3, 6 can preferably be interchanged.

FIG. 1 shows a correspondingly designed DC circuit breaker 1, with a conventional relay driver arrangement 26 for the bypass switch 8 also being provided in addition to the second semiconductor circuit arrangement 22, which relay driver arrangement has two capacitors 15 as an energy source. The relay driver arrangement 26 is connected to the power supply unit 19 for energy supply, and also draws the energy for charging the capacitors 15 from the power supply unit 19.

According to FIG. 1, a second terminal of the second semiconductor circuit arrangement 22 is connected by circuitry to a first terminal of the bypass switch excitation coil 21, and a second terminal of the bypass switch excitation coil 21 is connected by circuitry to the first supply terminal 3 via the preferably provided dropping resistor 28.

The second semiconductor circuit arrangement 22 is, in this embodiment, which also has a relay driver arrangement 26, simply intended to actuate the bypass switch 8 in the case of a deactivation process which takes place after a detected short-circuit and/or overcurrent.

Preferably, in order to actuate the bypass switch excitation coil 21, the control unit 13 activates/deactivates the second semiconductor circuit arrangement 22 in a predeterminable manner in cycles, in particular according to pulse-width modulation, as indicated by a corresponding symbol in the control unit 13 in FIG. 1. There can also be a corresponding actuation in the other embodiments.

An operational activation/deactivation takes place in a DC circuit breaker 1 according to FIG. 1 by means of the relay driver arrangement 26, and the additional disconnecting switch driver arrangement 27, which also has capacitors 15 as an energy source. The relay driver arrangement 26 and the disconnecting switch driver arrangement 27 can be formed in one piece. In the case of a simple operational activation/deactivation, particularly quick opening of the bypass switch 8 is not required since high currents do not have to be connected. For this reason, the capacitors 15 are designed to be relatively weak or small, and do not cause any high closed-circuit currents in the power supply unit 19.

A choke 14 is preferably arranged in the first current section 2. The particularly quick opening of the bypass switch 8 that is now provided makes it possible to considerably reduce the size of the choke 14, since a short-circuit can now be deactivated at a much lower current than in the case of a conventional DC circuit breaker 1. As a result, semiconductor switches can also be used for the first semiconductor circuit arrangement 11 which have a lower load-bearing capacity, and which consequently also have smaller dimensions, which in turn leads to a lower loop inductance, which in turns shortens the commutation time of a short-circuit current to the first semiconductor circuit arrangement 11.

FIG. 2 shows a second embodiment, which does not have the relay driver arrangement 26, the relay driver arrangement 26—as already disclosed—being the circuit which is otherwise used for the slow operational switching, and which is also not shown in FIG. 2. The DC circuit breaker 1 according to FIG. 2 has only the second semiconductor circuit arrangement 22 in this respect.

In the case of a DC circuit breaker 1 according to FIG. 2, the control unit 13 is further designed to also activate/deactivate the second semiconductor circuit arrangement 22 in a predeterminable manner in cycles, according to pulse-width modulation, in the case of an operational switching process. Nevertheless, operational switching of this kind can take place with considerably lower power loading of the bypass switch excitation coil 21. FIG. 2 also shows a possible design of the second semiconductor circuit arrangement 22, comprising a MOSFET bridge circuit having four semiconductor switches. It should also be noted that, in FIG. 2, the bypass switch excitation coil 21 is somewhat spaced apart from the bypass switch 8, although this is still the bypass switch excitation coil 21 of the bypass switch 8.

The actuation of the two disconnecting switches 9, 10 is not shown in FIG. 2, but can also take place by means of the second semiconductor circuit arrangement 22.

FIG. 3 shows a third embodiment of a DC circuit breaker 1 according to the invention. According to this embodiment, there is also no relay driver 27 that is powered by a power supply unit for the switching processes of the first and second disconnecting switch 9, 10; rather, this switching process takes place by power provided from the smoothing capacitance 18 of the rectifier 17. Accordingly, the second semiconductor circuit arrangement 22 is connected by circuitry to the first disconnecting switch excitation coil 23 and/or the second disconnecting switch excitation coil 24, and also to the first supply terminal 3 and the second supply terminal 6. In FIG. 3, two independent blocks having reference sign 22 are shown in this respect, although it is preferable for these two blocks to be formed in one piece in the actual realization thereof.

In addition, FIG. 4 simply shows an input-side detail of a DC circuit breaker 1 according to the invention. Said circuit breaker has at least one capacitor 92 between the first supply terminal 3 and the second supply terminal 6, which capacitor is preferably designed as an electrolytic capacitor. In FIG. 4, two such capacitors 92 are shown, along with a diode for ensuring the reverse-polarity protected operation of the capacitors 92. In addition, resistors 94 are connected in parallel with the capacitors 92 in order to ensure the same voltage at each of the capacitors 92 by means of a voltage distributor. The circuit according to FIG. 4 has advantages in terms of long line lengths between the rectifier 17 and its capacitors 18 and the DC circuit breaker 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A DC circuit breaker, comprising:
   a first current section of a first electrical polarity from a first supply terminal of the DC circuit breaker to a first load terminal of the DC circuit breaker;
   a second current section of a second electrical polarity from a second supply terminal of the DC circuit breaker to a second load terminal of the DC circuit breaker;
   a mechanical bypass switch arranged in the first current section or the second current section, the mechanical bypass switch having at least one bypass switch excitation coil;
   a first semiconductor circuit arrangement connected in parallel with the mechanical bypass switch;

an electronic control unit of the DC circuit breaker configured to actuate the first semiconductor circuit arrangement;

a second semiconductor circuit arrangement configured to be actuated by the electronic control unit, which second semiconductor circuit arrangement is connected to the bypass switch excitation coil by circuitry in order to actuate the second semiconductor circuit arrangement, wherein at least one terminal of the second semiconductor circuit arrangement is directly connected to the second supply terminal by circuitry.

2. The DC circuit breaker according to claim 1, wherein a current path comprising the second semiconductor circuit arrangement and the bypass switch excitation coil is connected by circuitry, comprising a dropping resistor, to the first supply terminal.

3. The DC circuit breaker according to claim 1, further comprising a power supply unit configured to supply at least the electronic control unit with energy, and wherein the at least one terminal of the second semiconductor circuit arrangement is directly connected by circuitry to the second supply terminal, bypassing the power supply unit.

4. The DC circuit breaker according to claim 1, wherein the electronic control unit is configured to detect a short-circuit and/or overcurrent, and wherein the electronic control unit is configured to activate/deactivate the second semiconductor circuit arrangement in a predeterminable manner in cycles according to pulse-width modulation if a short-circuit and/or overcurrent is detected.

5. The DC circuit breaker according to claim 1, wherein the electronic control unit is configured to activate/deactivate the second semiconductor circuit arrangement in a predeterminable manner in cycles according to pulse-width modulation during an operational switching process.

6. The DC circuit breaker according to claim 1, wherein a first disconnecting switch having a first disconnecting switch excitation coil is arranged in the first current section, wherein a second disconnecting switch having a second disconnecting switch excitation coil is arranged in the second current section, and wherein the first disconnecting switch excitation coil and the second disconnecting switch excitation coil are connected by circuitry to the at least one second semiconductor circuit arrangement.

7. The DC circuit breaker according to claim 1, wherein at least one capacitor is connected between the first supply terminal and the second supply terminal.

8. A system, comprising:

a rectifier, and the DC circuit breaker according to claim 1, wherein the rectifier has at least one smoothing capacitor, wherein the DC circuit breaker is connected to an output of the rectifier, and wherein the at least one smoothing capacitor of the rectifier is configured to supply energy to the second semiconductor circuit arrangement of the DC circuit breaker.

* * * * *